(12) United States Patent
Oppelt et al.

(10) Patent No.: US 6,440,348 B1
(45) Date of Patent: Aug. 27, 2002

(54) METHOD AND MOULD FOR PRODUCING UMBRELLA INSULATORS

(75) Inventors: Herbert Oppelt, Frensdorf; Willi Deuerling, Mühlendorf, both of (DE)

(73) Assignee: Trench Germany GmbH, Bamberg (DE)

( * ) Notice: Subject to any disclaimer, the term of this patent is extended or adjusted under 35 U.S.C. 154(b) by 0 days.

(21) Appl. No.: 09/485,063

(22) PCT Filed: Jul. 29, 1998

(86) PCT No.: PCT/DE98/02209

§ 371 (c)(1),
(2), (4) Date: Feb. 3, 2000

(87) PCT Pub. No.: WO99/08290

PCT Pub. Date: Feb. 18, 1999

(30) Foreign Application Priority Data

Aug. 8, 1997 (DE) .......................................... 197 34 362

(51) Int. Cl.[7] .......................... B29C 33/42; B29C 33/46; B29C 39/18
(52) U.S. Cl. ................ 264/279; 264/271.1; 264/335; 264/259; 251/351; 425/121; 425/556
(58) Field of Search .................. 264/334, 335, 264/318, 259, 250, 254, 275, 279, 271.1; 174/174, 178; 425/129.1, 121, 122, 556; 251/351

(56) References Cited

U.S. PATENT DOCUMENTS

| | | | | |
|---|---|---|---|---|
| 4,372,907 A | | 2/1983 | Herold et al. | |
| 4,620,959 A | * | 11/1986 | Goto et al. | 264/335 |
| 4,690,630 A | | 9/1987 | Patrick et al. | |
| 5,023,406 A | * | 6/1991 | Thornley | 174/209 |
| 5,556,587 A | * | 9/1996 | Funahashi et al. | 264/335 |
| 5,648,132 A | | 7/1997 | Shigehiko et al. | |
| 5,702,731 A | * | 12/1997 | Hayakawa et al. | 425/125 |
| 5,914,462 A | * | 6/1999 | Fujii | 174/179 |
| 6,019,931 A | * | 2/2000 | Kashiwagi | 264/496 |
| 6,033,201 A | * | 3/2000 | Kashiwagi | 425/116 |
| 6,042,771 A | * | 3/2000 | Kashiwagi | 264/261 |
| 6,051,796 A | * | 4/2000 | Kuhl et al. | 174/179 |
| 6,242,902 B1 | * | 6/2001 | Smith | 324/127 |

* cited by examiner

*Primary Examiner*—Angela Ortiz
(74) *Attorney, Agent, or Firm*—Barnes & Thornburg

(57) ABSTRACT

The invention seeks to provide an improved method for producing umbrella-type insulators comprising a core which is configured as a full body or a hollow cavity and umbrellas connected thereto, whereby problem-free de-moulding of said umbrella-type elements is guaranteed despite the fact that a vacuum is formed. This is achieved by fact that the mould (5) is used with at least one valve (8) which is arranged laterally and which extends as far as the surface (4.2) of the umbrella elements or sleeve (4). Immediately after the beginning or during axial movement of the mould (5) away from the umbrella-type element (3) with a sleeve (4), a gas medium is automatically introduced into the cavity (9) which is formed between the core (2) and umbrella-type element (3) with a sleeve (4) and the mould (5) or the valve (S) opens under the effect of traction or pressure and the gaseous medium is thus introduced into the hollow cavity (9).

18 Claims, 2 Drawing Sheets

METHOD AND MOULD FOR PRODUCING UMBRELLA INSULATORS

This application is a national stage application of PCI/DE98/02209, filed Jul. 29, 1998.

The present invention relates to a method and a mold for producing an umbrella-type insulator made of plastic material, having a core constructed as a solid body and having umbrellas connected with the core as well as having collars which are molded to the umbrellas and coaxially surround the core, by a mold which reaches coaxially around the core and forms a ring gap with respect to the core at the collar end of the respective umbrella to be molded. The ring gap being sealed off by means of an elastic seal, and wherein after sealing off, a first pourable material, which cross-links with the core to form a firm electrically insulating body, is poured into the mold and after the cross-linkage and the formation of the respective umbrella with the collar, the mold with the seal is moved away from the umbrella and in the process, the formed umbrella with the collar is removed from the mold.

An umbrella-type insulator of this type is known from German Patent Document DE-A-23 00 145. It consists of a core and of several umbrellas which are molded to the core and have one downward-extending collar respectively molded to the umbrellas and connected with the core. The production takes place such that first a two-part mold, which is tightly pressed together, is placed over the core and forms a funnel-shaped casting mold; during the pouring-in of the insulating material, the conical portion of the casting mold forming the umbrella and its lower portion forming the collar. On the bottom, the mold surrounds the core at a distance in the form of a ring gap which is sealed off before the casting process by a sealing ring. After the solidification of the insulating material, the mold parts are laterally taken off.

In tests with a single-part or multi-part casting mold which, after the solidification of the insulating or casting material, is pulled away in the downward direction, it was found that, when the umbrella is removed from the mold by pulling away the mold in the downward direction, the umbrella is occasionally also pulled away downward and the edge of the umbrella is deformed to such an extent, that is, bent downward, that tensions or even cracks occur in the umbrella material. As the result, a perfect insulation will no longer be ensured.

It is an object of the present invention to provide a method and a mold by means of which it is possible to achieve a perfect removal of the umbrellas from the mold.

This object is achieved by utilizing a mold which has at least one laterally arranged valve which extends to a surface of one of the umbrella and the collar coaxially around the core; pouring a material into the mold which cross-links with the core to form the insulating body comprising a core, collar and umbrella; begin axial moving-away of the mold from the umbrella and collar resulting in a vacuum forming between the mold and the formed insulating body; and then opening the valve and allowing a gaseous medium to be introduced into a cavity formed between the insulator and the mold so that the pulling-away of the mold is permitted without any unacceptable deformation of the umbrella.

By means of these measures and characteristics according to the invention, the umbrella can no longer adhere to the mold during the removal from the mold because a vacuum forms between the mold and the umbrella only for a short time or not at all. The umbrella can therefore be removed from the mold without any deformation.

Additional advantageous details of the invention will be described in detail in the following by means of the embodiments illustrated in the drawing.

Figure 1:
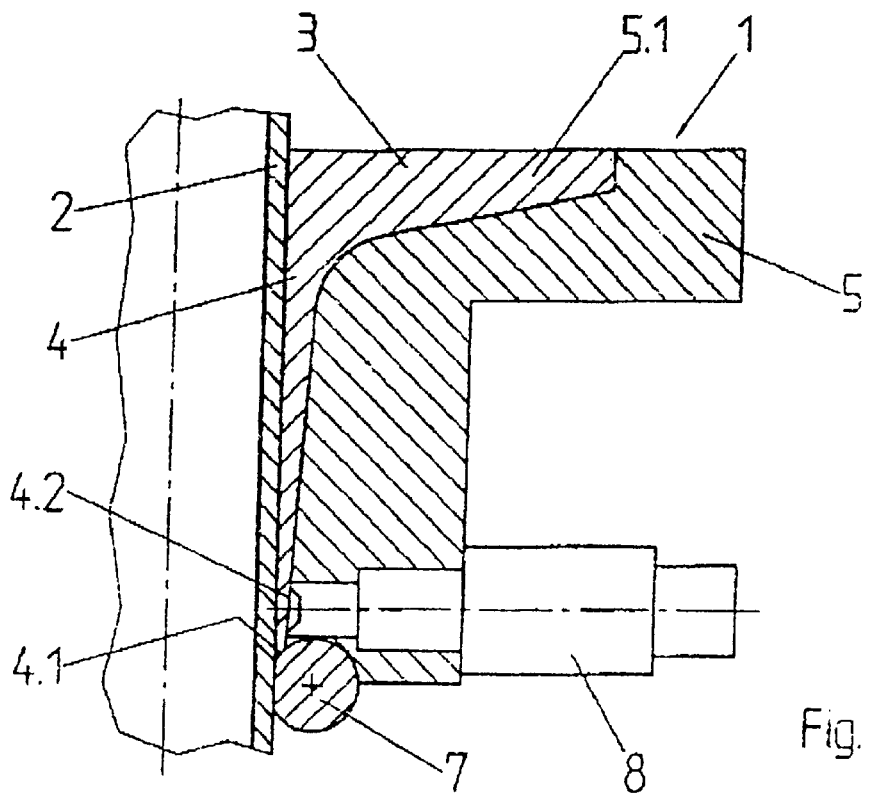
FIG. 1 is a one half of a cross-sectional lateral view of an umbrella molded to a core, while the mold is in the cast condition.

Reference number 1 indicates a portion of an umbrella-type insulator whose core is configured as a solid body or—as illustrated—a hollow body 2 and has an umbrella 3 molded thereto with a molded-on collar 4. The core 2 consists of an insulating material, particularly made of silicone, reinforced by means of reinforcing media, particularly glass fibers. A single-part or multi-part mold 5 is pushed over the core 2, which mold 5 has a funnel-shaped mold space 5.1 which is shaped corresponding to the umbrella 3 with the collar 4 to be molded. The portion 5.2 of the mold space 5.1 forming the collar 4 has a ring gap 6 at the collar end 4.1, which ring gap 6 is closed off for the casting process by an elastic seal 7, for example, in the form of a ring seal or O-seal.

A valve 8, for example, in the shape of a disk valve or cone valve, is provided, particularly screwed in laterally in the mold 5 in the area of the collar end 4.1. The exterior surface 8.1 of the valve 8 advantageously extends to the surface of the umbrella or to the surface 4.2 of its collar 4. In particular, it is flush with the surface 5.3 of the mold 5.

For producing an umbrella 3 with the collar 4, the mold is first placed at the assigned location on the core 2 or on the core wall and is sealed off by means of the elastic seal 7. Subsequently, the mold space 5.1 is filled from above with a casting material which then solidifies to an insulating molded body. An unreinforced or reinforced, at first pourable polymeric material, particularly silicone, which then solidifies by cross-linkage, is a suitable material. During the cross-linkage, this material bonds with the material of the core 2 or of the core wall.

Figure 2:
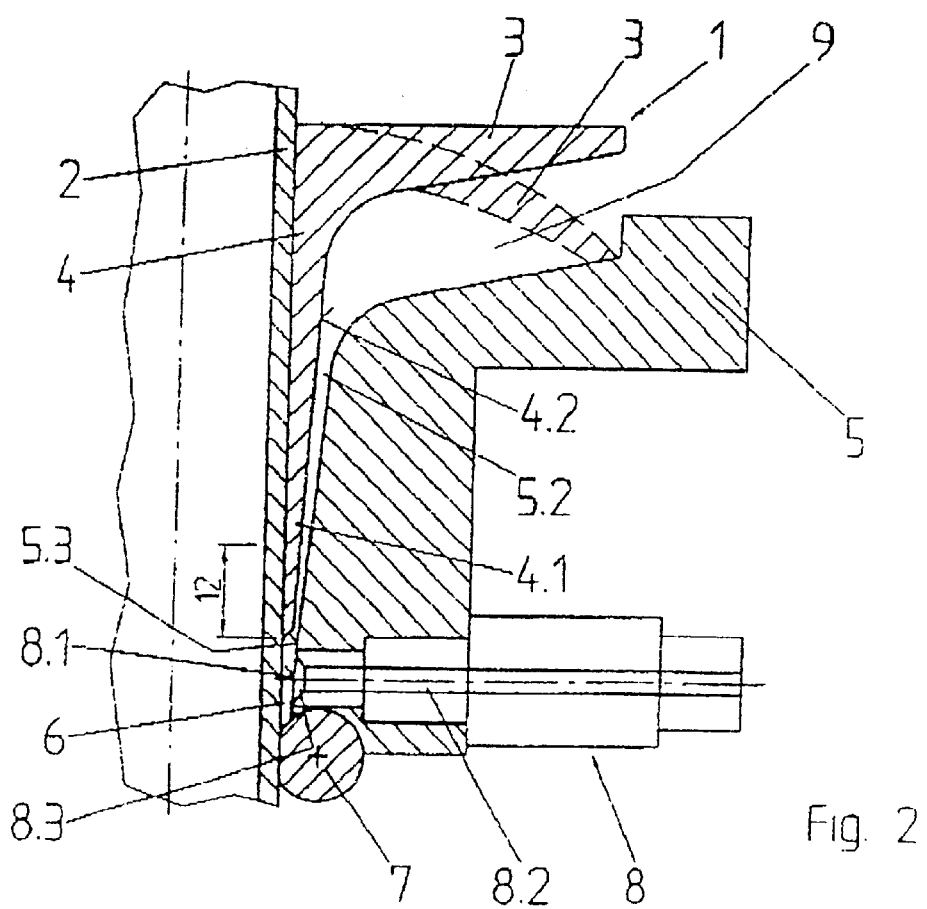
FIG. 2 is a view according to FIG. 1 in a partially de-molded condition with and without a deformation of the umbrella.

After the hardening or solidifying of the cast-in material, the mold 5, together with the seal 7, is moved away downward in the drawing. As illustrated in FIG. 2, this creates a cavity 9. A vacuum is formed in the cavity 9 and, when the valve 8 is absent, pulls the umbrella 3 downward in the manner indicated by a broken line, which may cause tension or even cracks on its top side.

According to the invention, because of the existing valve 8, when the mold 5 is moved away downward, this valve 8 can now open by itself because of the vacuum and/or additionally by the introduction or blowing-in of a gaseous medium, particularly air, for example, with an excess pressure. As the result, the umbrella 3 with the collar 4 can be removed from the mold 5 without any deformation, so that a perfect insulation of the material of the umbrella 3 is ensured. Reference is made in this regard to the solid lines of the umbrella 3 in FIG. 2.

Figure 3:
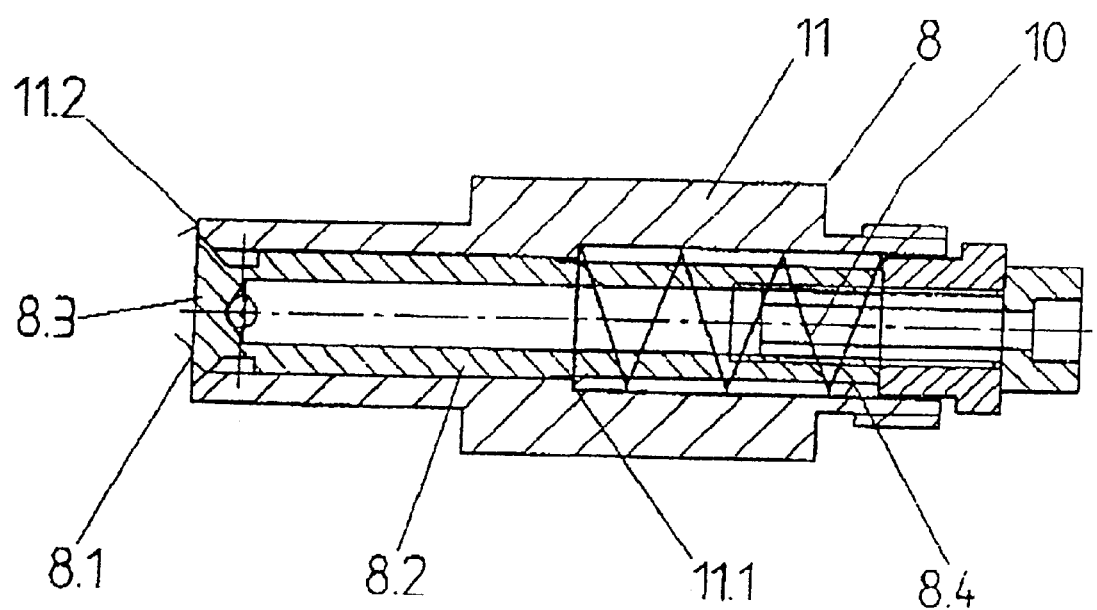
FIG. 3 is a cross-sectional view of a valve inserted in the mold.

In the embodiment, a valve with a valve tappet 8.2 and with a valve disk or cone 8.3 is used as the valve 8. The activating into the open position takes place by means of pressure onto the valve tappet 8.2 against the force of a pressure spring 10 which is clamped in between a stop 8.4 of the valve tappet 8.2 and a stop 11.1 of a valve housing 11, as illustrated in FIG. 3. As the result of the corresponding construction of the valve tappet 8.2, it can also be activated by pulling. The activating can take place mechanically, electrically, hydraulically or pneumatically.

The exterior surface 8.1 of the valve cone 8.3 and the edge 11.2 of the valve housing 11 surrounding the exterior surface 8.1 are preferably ground jointly in a single grinding process.

The valve 8 can advantageously be mounted in the mold 5 such that it is situated in the area of the portion 5.2 of the mold space 5.1 forming the collar 4 or in the area 12 of the collar end 4.1.

It is also advantageous for the mold-side valve surface (exterior surface 8.1) to be aligned with the adjacent mold surface 5.3.

The valve 8 preferably has a valve tappet 8.2 with a mold-side valve disk or valve cone 8.3.

The valve tappet 8.2 is advantageously guided in a valve housing 11 and is held in the closed position by means of a pressure spring 10, in which case the exterior surface 8.1 of the valve disk or valve cone 8.3 and the edge 11.2 of the valve housing 11 surrounding the valve disk or valve cone 8.3 are constructed in a jointly ground manner.

Finally, the valve 8 may be laterally inserted, particularly screwed into the mold 5.

The removal from the mold preferably takes place in that the mold is first moved away so far downward that the valve cone or the valve disk 8.3 during the opening of the valve 8 cannot press against the collar 4 but possibly strikes against the core 2.

What is claimed is:

1. A method for producing an umbrella insulator made of plastic material, having a core constructed as a solid body and having umbrellas connected with the core as well as having collars which are molded to the umbrellas and coaxially surround the core, by a mold which reaches coaxially around the core and forms a ring gap with respect to the core at the collar end of the respective umbrella to be molded, the ring gap being sealed off by an elastic seal, and wherein after sealing off, a first pourable material, which cross-links with the core to form a firm electrically insulating body, is poured into the mold and after the cross-linkage and the formation of the respective umbrella a with the collar, the mold with the seal is moved away from the umbrella and in the process, the formed umbrella with the collar is removed from the mold, comprising:

providing a mold which has at least one laterally arranged valve which extends to a surface of one of the umbrella and the collar coaxially around the core;

pouring a material into the mold which cross-links with the core to form the insulating body comprising a core, collar and umbrella;

begin axial moving-away of the mold from the umbrella and collar resulting in a vacuum forming between the mold and the formed insulating body;

then opening the valve and allowing a gaseous medium to be introduced into a cavity formed between the insulator and the mold so that the pulling-away of the mold is permitted without any unacceptable deformation of the umbrella.

2. The method according to claim 1, wherein when the umbrella with the collar is separated from the mold the valve first opens automatically because of the vacuum formed in cavity and subsequently the gaseous medium is blown in under pressure.

3. The method according to claim 1, wherein the gaseous medium is introduced into the cavity from the outside with excess pressure.

4. The method according to claim 1, wherein the valve is activated by any one of a mechanical, pneumatic, electric or hydraulic mechanism.

5. The method according to claim 4, wherein the valve is controlled by way of a valve tappet which opens in response to pressure onto the valve tappet.

6. The method according to claim 4, wherein the valve is controlled by a valve tappet which opens in response to a pull on the valve tappet.

7. The method according to claim 1, wherein the mold has its valve opening into an end area of the mold forming the collar, and wherein the valve is not opened before the mold has been separated enough that an exterior surface of the valve is situated below an end of the collar.

8. A mold for producing an umbrella insulator made of plastic material, having a core constructed as a solid body and having umbrellas connected with the core as well as having collars which are molded to the umbrellas and coaxially surround the core, wherein the mold comprises, a mold part reaching coaxially around the core and forming a ring gap with respect to the core at a collar end of one of the umbrellas to be molded, an elastic seal for sealing off the ring gap, at least one laterally arranged valve which extends to a surface of one of the umbrellas and the collar coaxially around the core, and wherein the valve is operable to open automatically or by means of pull or pressure for allowing a gaseous medium to be introduced into a cavity formed between the insulator and the mold and the mold is formed with a funnel-shaped mold space and the valve opens into an area of the mold space forming the collar.

9. The mold according to claim 8, wherein the valve opens into the area of an end of the collar.

10. The mold according to claim 8, wherein a mold-side valve surface is aligned with an adjacent mold surface.

11. The mold according to claim 8, wherein the valve has a valve tappet with a mold-side valve disk.

12. The mold according to claim 11, wherein the valve tappet is guided in a valve housing and is held in the closed position by means of a pressure spring, and wherein an exterior surface of the valve disk and an edge of the valve housing surrounding the valve disk are constructed to have a smooth transition by jointly grounding of the disk and valve housing.

13. The mold according to claim 8, wherein the valve is laterally inserted into the mold.

14. The mold according to claim 13, wherein both the valve and mold are provided with screw threads and the valve inserted into the mold by screw action.

15. The mold according to claim 9, wherein the valve is laterally inserted into the mold.

16. The mold according to claim 10, wherein the valve is laterally inserted into the mold.

17. The mold according to claim 11, wherein the valve is laterally inserted into the mold.

18. The mold according to claim 12, wherein the valve is laterally inserted into the mold.

* * * * *